March 24, 1964  F. C. BLANCHA  3,126,446

MEANS FOR OPTICAL FOCUSING

Filed Dec. 5, 1961

INVENTOR.
FELIX C. BLANCHA
BY
George T. Craig
Attorney

United States Patent Office 3,126,446
Patented Mar. 24, 1964

3,126,446
MEANS FOR OPTICAL FOCUSING
Felix C. Blancha, Moorestown, N.J., assignor to Radio Corporation of America, a corporation of Delaware
Filed Dec. 5, 1961, Ser. No. 157,093
8 Claims. (Cl. 178—5.4)

The present invention relates to improved optical systems and more particularly to an improved focusing system especially useful in color television cameras having a field lens and in which the light rays are parallel in a portion of the camera optical path.

A color television camera has a signal generating tube, one for each of the image colors. The optical system of the camera employs means to separate light in the optical path of the camera into primary colors of the subject. Light of each color is directed onto the respective signal generating tube. With a relatively short focal length objective lens an auxiliary optical system provides space between the objective lens and the image plane or planes to accommodate the light separating means. A widely used form of auxiliary optical system is a field lens mounted between the objective lens and an image relaying lens system comprising two relatively long focal length relay lenses between which the light rays are essentially parallel.

Heretofore, camera focusing has been accomplished by moving the main objective lens and lens support, which is heavy, and must be supported accurately in alignment while providing for focusing movement. If a plurality of objective lenses are mounted for selection in a rotatable turret, a severe mechanical design problem is presented since the turret must be easily rotated and the turret assembly must slide back and forth to accomplish focusing.

An object of the present invention is to provide a novel focusing means for an optical system having a field lens and a light relaying lens system.

Another object of the present invention is to provide a novel focusing system for a camera which avoids the need for moving the camera objective lens in an axial direction.

A further object of the invention is to provide novel means for focusing a color television camera having a field lens and an optical relay system.

In accordance with the present invention, focusing is accomplished by simultaneously moving both the field lens and the one of the relaying lens system which is nearer the field lens. This provides camera focusing while maintaining constant the distance between these two lenses. The parallelism of the light rays in the region between the two lenses of the relaying lens system permits these two relay lenses to be moved with respect to each other without deterioration of the focused image.

Other objects and advantages of the present invention will become apparent and immediately suggest themselves to those skilled in the art to which the invention is directed from a reading of the following specification in connection with the accompanying drawing in which.

Figure 1:
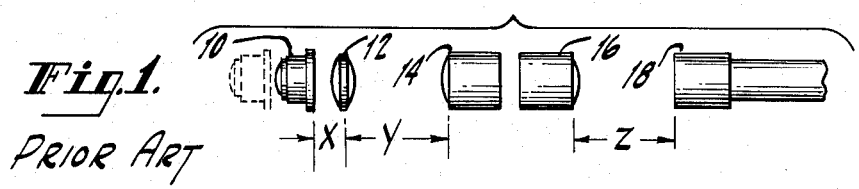
FIGURE 1 is a diagrammatic showing of the usual camera focusing arrangement of the prior art.
Figure 2:
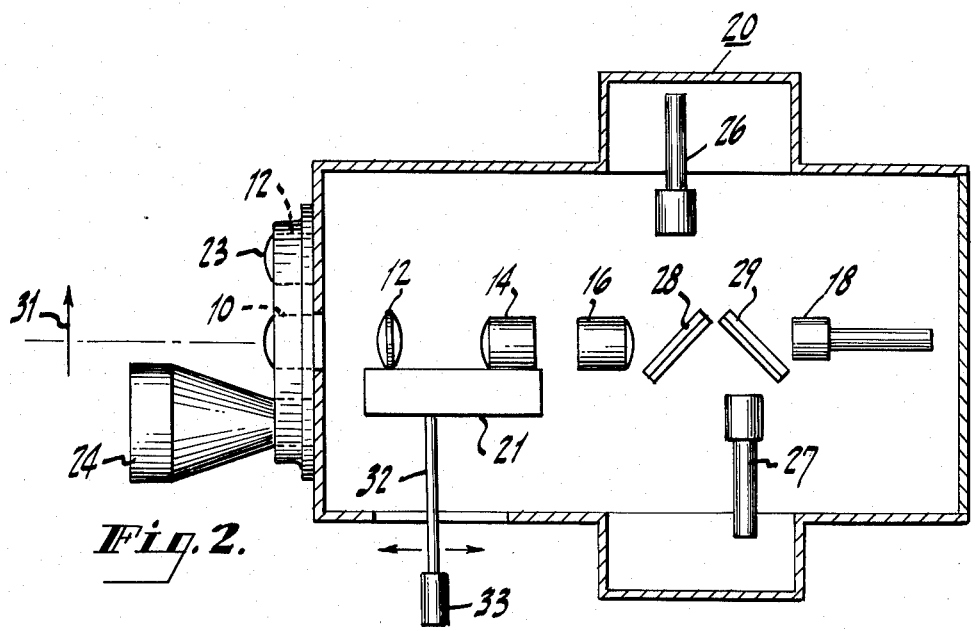
FIGURE 2 is a diagrammatic representation in plan of a color television camera embodying the present invention.

Referring for the present to FIGURE 1, showing a typical television camera having a camera or main objective lens 10, a field lens 12, a relaying lens system comprising two relay lenses 14 and 16 and a camera tube 18, focusing is accomplished in the usual manner by moving the main objective lens 10 relative to the rest of the optical system which is relatively fixed in the camera. This changes the distance X while the distance Y remains constant. As pointed out above, in a practical camera the main objective lens is located with several other lenses of various focal lengths on a rotatable turret as shown by FIGURE 2. This turret, especially if it contains long telephoto lenses, is heavy. The rigidity with which this turret must be held for each lens position, the fact that the turret must be readily rotatable, and the added requirement that the entire or portions of, the turret assembly must be slidable to accomplish optical focusing presents a severe mechanical design problem. A sliding or other reciprocable mount for this purpose is eliminated by the present invention.

FIGURE 2 of the drawing is a diagrammatic showing of the invention embodied in a color television camera 20. A camera of this general construction is shown in Patent No. 2,672,072 granted to Sachtleben et al. on March 16, 1954. The reference characters assigned for parts appearing in FIGURE 1 will be used in FIGURES 2 to 4. The camera 20 has a lens turret 12 in which are mounted a plurality of objective lenses 10, 23 and 24. The lens 24 is shown as a telephoto lens. The turret is mounted about an axis (not shown) for rotation to position a desired objective lens in the optical axis of the camera 20. The patent referred to above shows details of a rotatable mounting for a turret. Camera tubes 26 and 27, in addition to the tube 18, are employed for multicolor signal generation.

The optical system also includes color selective apparatus located on the camera optical axis following the relaying lens system including dichroic reflector 28 for reflecting red light and transmitting green and blue light, and a dichroic reflector 29 for reflecting blue light and transmitting green light. With the arrangement described, the tube 18 serves a green video signal generating tube, the tube 26 as a generator of red signals and the tube 27 as a blue signal generator.

It will be understood that the number of camera tubes will be determined by the nature of the color television signal to be generated and that the color separation or selective apparatus may be any desired kind. It may be of the crossed dichroic type described in the patent referred to above. As in FIGURE 1, the two lenses 14 and 16 of the relaying lens system are located in the light path from the camera objective lens. The latter will be one of the lenses 10, 23 or 24 depending on the angular position of the turret 12.

Figure 3:
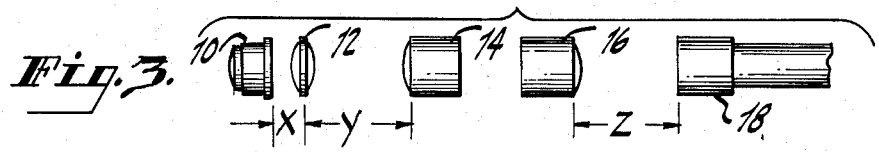
FIGURES 3 and 4 are views similar to FIGURE 2, showing the relative position of the optical parts when focused on a distant object and a close-up object respectively, the light separating means and the lens turret being omitted for the sake of convenience.
Figure 4:
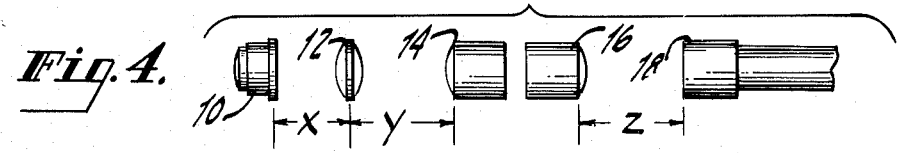

The relay lens 14 and the field lens 12 are carried by a support or carriage 21 movable longitudinally of the axis of the camera objective lens 10 and camera tube 18. The carriage 21 is shown by way of example as being movable by a rod 32 provided with a handle 33 which is available outside of the camera housing. It will be understood that any suitable type of support or carriage equipped with manual or automatic moving means may be employed so long as the optical spacing between the field lens 12 and the relay lens 14, indicated by Y on FIGURES 3 and 4 is maintained.

What is claimed is:
1. An optical system comprising an objective lens in fixed longitudinal position with respect to an image plane, two image relay lenses located in the light path between said objective lens and said image plane, a field lens located in said path between said objective and relay lenses, and means for simultaneously moving said field lens and the one of said relay lenses nearest said field lens axially in like direction and magnitude along said path to focus said system.
2. An optical system comprising an objective lens in fixed longitudinal position with respect to an image plane, two image relay lenses located in the light path between said objective lens and said image plane, a field lens located in said path between said objective and relay lenses, means to maintain said field lens and the one of said relay lenses nearest said field lens at a fixed distance relative to each other, and means for simultaneously moving said field lens and said one of said relay lenses axially along said path to focus said system.

3. An optical system for a camera comprising light sensitive means for receiving a focused optical image, a camera objective lens spaced from said light sensitive means to provide a light path from a scene or object to said light sensitive means, said objective lens being fixed in position in said camera, two image relay lenses located in said light path between said camera objective lens and said light sensitive means, a field lens located in said light path between said camera objective lens and said image relay lenses, and means to maintain said field lens and the one image relay lens nearest said field lens at a fixed distance relative to each other, said last named means being movable along said light path with respect to said camera objective lens and said other image relay lens to focus said camera.

4. An optical system for a television camera comprising a video signal producing tube, a camera objective lens spaced from said tube to provide a light path from a scene or object to said tube, said objective lens being fixed in position in said camera, two image relay lenses located in said light path between said camera objective lens and said tube, a field lens located in said light path between said camera objective lens and said image relay lenses, and a carriage to which is fixed said field lens and the one image relay lens nearest said field lens, said carriage being movable along said light path with respect to said camera objective lens and said other image relay lens to focus said camera.

5. An optical system for a television camera comprising means to provide a light sensitive surface, a camera objective lens spaced from said light sensitive surface to provide a light path from a scene or object to said surface, said objective lens being maintained in a position in a plane intersecting said light path, an image relaying system comprising two objective lenses located in said light path between said camera objective lens and said light sensitive surface, a field lens located in said light path between said camera objective lens and said image relaying apparatus, and means to maintain said field lens and the one image relaying objective lens nearest said field lens at a fixed distance relative to each other, said last named means being movable along said light path with respect to said camera objective lens and said other image relaying objective lens to focus said camera.

6. An optical system for a television camera comprising a video signal producing tube, a camera objective lens spaced from said tube to provide a light path from a scene or object to said tube, said objective lens being maintained in a position in a plane intersecting said light path, an image relaying system comprising two objective lenses located in said light path between said camera objective lens and said tube, a field lens located in said light path between said camera objective lens and said image relaying apparatus, and means to maintain said field lens and the one image relaying objective lens nearest said field lens at a fixed distance relative to each other, said last named means being movable along said light path with respect to said camera objective lens and said other image relaying objective lens to focus said camera.

7. An optical system for a color camera comprising a plurality of light sensitive surfaces, one for each of a plurality of component colors, a camera objective lens spaced from said light sensitive surfaces, said objective lens being maintained in a position in a plane intersecting said light path, color selective apparatus in said light path between said objective lens and said light sensitive surfaces, an image relaying system comprising two objective lenses and said color selective apparatus, a field lens located in said light path between said camera objective lens and said image relaying apparatus, and means to maintain said field lens and the one image relaying objective lens nearest said field lens at a fixed distance relative to each other, said last named means being movable along said light path with respect to said camera objective lens and said other image relaying objective lens to focus said camera.

8. An optical system for a color television camera comprising a video signal producing tube for each of a plurality of component colors, a camera objective lens spaced from said tubes to provide a light path from a scene or object to said tubes, said objective lens being maintained in a position in a plane intersecting said light path, color selective apparatus in said light path between said objective lens and said tubes, an image relaying system comprising two objective lenses located in said light path between said camera objective lens and said color selective apparatus, a field lens located in said light path between said camera objective lens and said image relaying apparatus, and means to maintain said field lens and the one image relaying objective lens nearest said field lens at a fixed distance relative to each other, said last named means being movable along said light path with respect to said camera objective lens and said other image relaying objective lens to focus said camera.

No references cited.